(12) United States Patent
Traub et al.

(10) Patent No.: US 12,296,368 B2
(45) Date of Patent: May 13, 2025

(54) METHOD FOR JOINING EDGES AND/OR SURFACES OF A PROFILE, JOINING ROLLER ARRANGEMENT AND PROFILING INSTALLATION

(71) Applicant: DREISTERN GmbH & Co. KG, Schopfheim (DE)

(72) Inventors: Tilman Traub, Neuenburg (DE); Christoph Grüllich, Schopfheim (DE)

(73) Assignee: DREISTERN GmbH & Co. KG, Schopfheim (DE)

( * ) Notice: Subject to any disclaimer, the term of this patent is extended or adjusted under 35 U.S.C. 154(b) by 177 days.

(21) Appl. No.: 17/964,142

(22) Filed: Oct. 12, 2022

(65) Prior Publication Data
US 2023/0113975 A1    Apr. 13, 2023

(30) Foreign Application Priority Data
Oct. 12, 2021   (EP) .................................... 21202237

(51) Int. Cl.
*B23K 20/00* (2006.01)
*B21C 37/08* (2006.01)
(Continued)

(52) U.S. Cl.
CPC ...... *B21C 37/0807* (2013.01); *B21C 37/0803* (2013.01); *B21C 37/0822* (2013.01);
(Continued)

(58) Field of Classification Search
CPC ..... B21C 37/08; B23K 11/062; B23K 13/025; B23K 13/046; B23K 37/0535
See application file for complete search history.

(56) References Cited

U.S. PATENT DOCUMENTS

| 2005/0103757 A1* | 5/2005 | Gysi ..................... B23K 37/047 |
| | | 219/121.64 |
| 2011/0247715 A1* | 10/2011 | Ishiguro .................. B21C 37/08 |
| | | 72/368 |
| 2015/0076117 A1* | 3/2015 | Neugebauer ......... B23K 31/027 |
| | | 219/61.5 |

FOREIGN PATENT DOCUMENTS

| FR | 2460745 | 1/1981 |
| GB | 1559858 | 1/1980 |

(Continued)

OTHER PUBLICATIONS

Planeau et al. (FR2460745A) computer translation (Year: 2024).*
Hiramitsu (JP01-170524A) computer translation (Year: 2024).*

*Primary Examiner* — Erin B Saad
(74) *Attorney, Agent, or Firm* — Volpe Koenig

(57) ABSTRACT

A method for joining edges and/or surfaces of a profile in a profiling installation for longitudinally forming a virtually endless material strip into an at least partially closed profile shape. The material strip or profile is formed roll forming tools into a profile which is closed or partially closed, and is fixed in a joining zone, with a longitudinally running joining seam being formed. The profile passes in the joining zone through a joining roller arrangement and/or planar joining arrangement to feed the profile to a joining point and to stabilize the profile there, and/or to ensure that it is dimensionally stable during and after joining. Forces or magnitudes of force components which act on the profile from at least one of the joining rollers and/or a subsection of the planar joining arrangement are detected in the joining zone. A planar joining arrangement and a profiling installation are also provided.

9 Claims, 4 Drawing Sheets

(51) Int. Cl.
*B21C 51/00* (2006.01)
*B21D 5/08* (2006.01)
*B23K 1/00* (2006.01)
(52) U.S. Cl.
CPC .............. *B21C 51/00* (2013.01); *B21D 5/083* (2013.01); *B23K 1/00* (2013.01); *B23K 20/00* (2013.01)

(56) References Cited

FOREIGN PATENT DOCUMENTS

| | | |
|---|---|---|
| JP | H01170524 | 7/1989 |
| JP | H11254031 | 9/1999 |
| WO | 2020077378 | 4/2020 |

\* cited by examiner

METHOD FOR JOINING EDGES AND/OR SURFACES OF A PROFILE, JOINING ROLLER ARRANGEMENT AND PROFILING INSTALLATION

INCORPORATION BY REFERENCE

The following documents are incorporated herein by reference as if fully set forth: European Patent Application No. Appln No. 21202237.0, filed Oct. 12, 2021.

TECHNICAL FIELD

The invention relates to a method for joining edges and/or surfaces of a profile in a profiling installation for longitudinally forming a virtually endless material strip or profile into an at least partially closed profile shape. The invention also relates to a joining roller arrangement for carrying out the method, to a planar joining arrangement for carrying out the method, and to a profiling installation.

BACKGROUND

In a method of the present type, a material strip, a plate or a profile is formed in a profiling installation by means of a plurality of roll forming tools into a profile shape which is closed per se or is partially closed, and said profile shape is fixed in a joining zone of the profiling installation by a joining method, such as in particular welding, brazing, adhesive bonding or folding, during a longitudinal pass of the profile, with a longitudinally running joining seam being formed. In the joining zone, the profile passes here through a joining roller arrangement and/or a planar joining arrangement in order to feed the profile in a controlled manner to a joining point and in particular to stabilize said profile at the joining point, and/or to ensure that the profile is dimensionally stable during and after joining. The intention here is to form a stable joining seam.

A profiling installation of the present type is used in this method, and it contains a plurality of roll forming tools for successively forming the material strip or profile or the plate into a profile shape which is closed per se or is partially closed. In a joining zone, it furthermore has a joining device in order to secure the profile, which is closed per se or is partially closed, at a joining point by a joining method, such as in particular welding, brazing, adhesive bonding or folding, during a longitudinal pass of the profile, with a longitudinally running connecting seam being formed. In the joining zone there is a joining roller arrangement and/or a planar joining arrangement in order to feed the profile in a controlled manner to the joining point and in particular to stabilize said profile at the joining point, and/or to ensure that the profile is dimensionally stable during and after the joining.

A profiling installation generally manufactures profiles of very different cross-sectional shapes in a virtually endless form from a metal strip, the designation "profile" being intended here to also include tubes. Depending on the profile shape, a multiplicity of roll forming tools are used for this purpose, which are combined in groups in typically 20 to 30 forming stations, which are arranged in linear succession, and successively form the desired metal profile by means of stepwise cold forming. The starting material is usually a metal strip but may also be plates or already preformed starting profiles, which are formed in the profiling installation to give a desired profile.

If tubes or closed profiles or else profiles which are only partially closed are manufactured in a profiling installation, the edges and/or surfaces of the profile which come to lie longitudinally against one another or on one another during closing of the profile shape have to be joined in a joining zone. Use is made for this purpose of all types of joining methods, in particular welding, brazing and adhesive bonding as integrally bonding joining methods, but also folding, crimping and the like as interlocking joining methods. In this case, a longitudinally running joining seam by means of which the profile shape is secured is produced during a longitudinal pass of the profile.

In such a joining zone there is generally a joining roller arrangement, wherein the latter may also be replaced or supplemented by a planar joining arrangement. The profile is therefore fed in a controlled manner to a joining point and in particular stabilized at the joining point. The joining roller arrangement and/or the planar joining arrangement generally not only ensure that the profile is stabilized at the joining point, but also that the profile can cure under controlled conditions, and also that the profile is dimensionally stable during and after joining.

A planar joining arrangement within the context of the present invention should be understood in general as meaning an arrangement which not only—like joining rollers—produces a linear contact with the passing-through profile, but also comes into contact with the profile by way of a larger planar contact region which moves with the profile.

A planar joining arrangement within the context of the present invention can therefore consist of a number of joining rollers, around which a flexible belt, a link belt or a link chain is looped, in particular as in the case of a conveyor belt. For example, it can be a chain-like structure with which a number of joining rollers are looped around in the manner of a chain of a caterpillar vehicle. In order to optimize the readability of the description of the present invention, only the joining roller arrangement and joining rollers are consequently explicitly mentioned below even though a joining roller arrangement and/or a planar joining arrangement and/or joining rollers and/or parts of the planar joining arrangement is/are discussed.

Joining roller arrangements for a method and a profiling installation of the present type are generally geometrically monitored, with the position of the individual joining rollers being adjusted manually or by motor. The operator of the profiling installation has to assess the accuracy of the roller position and in particular finely coordinate same, and the quality of the result and a readjustment of the roller positions that may be necessary during operation generally correlates with the experience of the relevant operators.

It is obvious that the reproducibility of results and the ensuring of the quality of results that depend on the experience of the operators are frequently in need of optimization. Added to this is the fact that operators who bring much experience when setting up and readjusting the joining roller arrangements are generally no longer available in situ if the process parameters change due to changes in quantity and quality of the profile materials and due to changes in the process environment.

If the arrangement and the positions of the joining rollers do not correspond, poor working results may arise, for example due to the joining seam breaking open again after the joining zone or due to deformations of the profile to be joined, even as far as crushing of the profile geometry.

Particularly in the case of integrally bonded joining methods, such as welding and adhesive bonding, it is also crucial for the quality and durability of the joining seam that the geometrical arrangement and the position of the joining rollers also correspond in a stabilization zone downstream of the joining point, in which the joining seam is cooled or cured in a controlled manner and only thereby obtains the necessary quality and durability.

SUMMARY

The invention is therefore based on the object of proposing a method for joining edges and/or surfaces of a profile in a profiling installation, and a profiling installation of the type mentioned at the beginning, a joining roller arrangement and/or a planar joining arrangement, with which a high-quality joining seam can be produced as far as possible substantially independently of the experience and ability of the operators.

This object is achieved by a method with one or more of the features disclosed herein, by a joining roller arrangement with one or more of the features disclosed herein, by a planar joining arrangement with one or more of the features disclosed herein, and by a profiling installation with one or more of the features disclosed herein.

Preferred developments of the method, the joining roller arrangement, the planar joining arrangement, as well as the profiling installation are described below and in the claims that follow.

The method according to the invention, in which the material strip, the plate or the profile is formed in the profiling installation by means of a plurality of roll forming tools into a profile shape which is closed per se or is partially closed, and said profile shape is secured in a joining zone of the profiling installation by a joining method during a longitudinal pass of the profile, with a longitudinally running joining seam being formed, wherein the profile passes in the joining zone through a joining roller arrangement and/or a planar joining arrangement in order to feed the profile in a controlled manner to a joining point and in particular to stabilize said profile at the joining point, and/or to ensure that the profile is dimensionally stable during and after joining, is therefore developed in comparison to the prior art in such a manner that forces or magnitudes of force components which act on the profile from at least one of the joining rollers and/or from at least one subsection of the planar joining arrangement are detected in the joining zone.

The joining roller arrangement proposed according to the invention for carrying out this method is distinguished in that at least for one joining roller there is a measurement transducer which determines at least one force component of the force acting on the passing-through profile from said joining roller.

The planar joining arrangement according to the invention for carrying out the method is likewise distinguished at least by one measurement transducer which determines at least one force component of the force acting on the passing-through profile from part of the planar joining arrangement.

The profiling installation according to the invention which has a plurality of roll forming tools for successively forming the material strip or profile or the plate into a profile shape which is closed per se or is partially closed, and which is provided with a joining device in a joining zone in order to secure the profile, which is closed per se or is partially closed, at a joining point by a joining method during a longitudinal pass of the profile, with a longitudinally running connecting seam being formed, wherein there is a joining roller arrangement and/or a planar joining arrangement in order to feed the profile in a controlled manner to the joining point and in particular to stabilize said profile at the joining point, and/or to ensure that the profile is dimensionally stable during and after joining, is modified in comparison to the prior art by the fact that the joining roller arrangement and/or the planar joining arrangement interacts with at least one measurement transducer in order to detect forces or magnitudes of force components which act on the profile from at least one of the joining rollers or from at least part of the planar joining arrangement.

The present invention is therefore based on the finding that the position of the joining rollers in the joining roller arrangement (or the positioning of the planar joining arrangement) is not primarily responsible for the quality and the success of the joining operation, but rather the pressure is which is exerted on the profile and which arises from the geometrical infeed or position of the joining rollers. Depending on the joining method, it is also crucial, as has been recognized according to the invention, how the holding pressure, which acts on the freshly joined profile, is distributed in a stabilization zone downstream of the actual joining point. If the pressure is insufficient locally or overall, the joining partners are not sufficiently compressed, and the joining seam may break open again. If the pressure on the profile is excessive, deformation of the profile and crushing of the actual profile geometry, and also a poor joining result, are threatened.

The present invention is based on the principle of monitoring and of controlling the process forces acting on the joining rollers (and/or on the planar joining arrangement) during joining and optionally also after joining. The process forces are intended to correlate here with the contact pressures acting on the profile in the joining zone.

By turning the focus away from the position of the joining rollers and directing the focus on the forces which act on the profile from the joining rollers and which are dimensioned in such a manner that they correlate with contact pressures acting on the profile, it is possible to automate the joining process and in particular to make the latter independent of the experience of the operators by providing even inexperienced operators with the parameters with which they can optimize the positioning of the joining roller arrangement (or of the planar joining arrangement).

According to a preferred development of the method according to the invention, the contact pressures acting on the profile in at least one spatial direction from at least some of the joining rollers and/or the planar joining arrangement are determined by the forces acting on the profile at the joining point and/or within the joining zone being detected according to the invention. The method therefore directly provides the variable on which, as has been recognized according to the invention, the quality of the joining process ultimately depends.

The contact pressures acting on the profile in the joining zone can be at least partially regulated on the basis of the forces or force components detected according to the invention by adjusting at least one joining roller in the joining roller arrangement and/or at least part of the planar joining arrangement, as a result of which not only is automization of the adjustment of the joining roller arrangement possible, but can also be automatically recognized, and an adaptation can optionally be carried out if, for example, the quality of the material of the profile or the geometry or quantity thereof, in particular the material thickness or material width changes.

Preferably, the contact pressures which act on the profile from the joining rollers and/or from the planar joining arrangement are regulated here at the joining point and/or downstream of the joining point in order to ensure the quality of the working result.

For the regulation of the contact pressures carried out within the scope of this preferred development of the method according to the invention, other process parameters, in particular the actual positions of the regions of the profile that are to be joined, or else the positions of the joining rollers or, for example, additional holding rollers or holding structures which are present can also be taken into consideration. This requires sensors for detecting the positions, but this outlay can be justified since the working results according to profile shape can hereby be optimized.

A further preferred refinement of the method according to the invention consists in that the profile passes after the joining point through a stabilization zone within the joining zone in order to stabilize the connecting seam by cooling and/or curing. This is indispensable in particular in the case of integrally bonded joining methods, such as welding and adhesive bonding. Part of the joining roller arrangement and/or of the planar joining arrangement serves here for stabilizing the profile in the stabilization zone, and forces which act on the profile from at least one of the joining rollers and/or at least part of the planar joining arrangement in the stabilization zone are detected according to the invention.

With this development of the method according to the invention, the finding is used that not only is the contact pressure which acts on the profile at the actual joining point crucial for the working result, but so too are the contact pressures in a downstream stabilization zone in which the connecting seam cools and/or cures and only thereby obtains its strength.

According to a further preferred refinement of the method according to the invention, when setting up the joining roller arrangement and/or the planar joining arrangement, specifications for contact pressures and/or forces acting on the profile in the joining zone are used as target values. By this means, even operators with little experience can be assisted and enabled to set up the joining roller arrangement and/or the planar joining arrangement in such a manner that a good joining result is obtained.

In order to identify changes in the process conditions and, when the changes are recognized, to output at least one warning indication, within the context of the method according to the invention forces which act on the profile from at least one of the joining rollers and/or at least from part of the planar joining arrangement are detected continuously in the joining roller arrangement and/or in the planar joining arrangement. Such a warning indication avoids waste being produced, even if no experienced operator is in situ who will react rapidly and appropriately to a change in the process conditions, or even if a change in the process conditions is not readily identifiable.

As a further advantageous refinement of the method according to the invention, finally target values for forces acting on the profile in the joining zone can be optimized continuously using machine learning algorithms. It is particularly advantageous if said algorithms contain access to further information which is detected upstream or downstream in the process. Upstream, this could be, for example, the detection of the width of the fed sheet metal strip. Downstream, for example, systems for quality assurance can be used. Examples of such systems are eddy current measuring devices for assessing weld seams, optical measuring devices for measuring joining points (in order, for example, to detect a seam collapse or a seam reinforcement) or geometrical measuring systems for detecting the profile cross section. The machine learning algorithms can correlate the quality features detected in such a way with the process variables detected in the joining zone, can readjust said process variables and continuously adapt and optimize the underlying control rules.

The joining roller arrangement according to the invention and/or the planar joining arrangement according to the invention for carrying out the method described and claimed here is preferably developed by the fact that at least one joining roller of the joining roller arrangement or at least part of the planar joining arrangement is adjustable by motor, wherein a controller is operatively connected to the joining roller arrangement and/or to the planar joining arrangement and to the measurement transducer in order to at least partially regulate the contact pressures acting on the profile in the joining zone on the basis of the detected forces by adjusting at least one joining roller in the joining roller arrangement and/or at least part of the planar joining arrangement.

The profiling installation according to the invention can be developed within the scope of the present invention by the fact that at least one joining roller of the joining roller arrangement and/or at least part of the planar joining arrangement is adjustable by motor, wherein a controller is operatively connected to the joining roller arrangement and/or to the planar joining arrangement and to the measurement transducer in order to at least partially regulate the contact pressures acting on the profile in the joining zone on the basis of the detected forces by adjusting at least one joining roller in the joining roller arrangement and/or at least part of the planar joining arrangement. By this means, the advantages and effects already described with respect to the method according to the invention are produced.

If the profiling installation according to the invention is equipped with a planar joining arrangement in the joining zone, it can finally be advantageous if the contact pressure of the planar joining arrangement is generated by means of pneumatic cylinders which act on the chain-like structure. This is because, in interaction with a planar joining arrangement, which can be configured, within the scope of the present invention, for example as a chain-like structure configured in particular, for example, in the manner of the chains of a track-laying vehicle, the spring-elastic properties of pneumatic cylinders can afford advantages.

BRIEF DESCRIPTION OF THE DRAWINGS

Exemplary embodiments for a profiling installation, for a joining roller arrangement according to the invention and for a planar joining arrangement according to the invention, on the basis of which a method designed by way of example according to the present invention is also described, will be explained below with reference to the attached drawings, in which.

DETAILED DESCRIPTION

Figure 1:
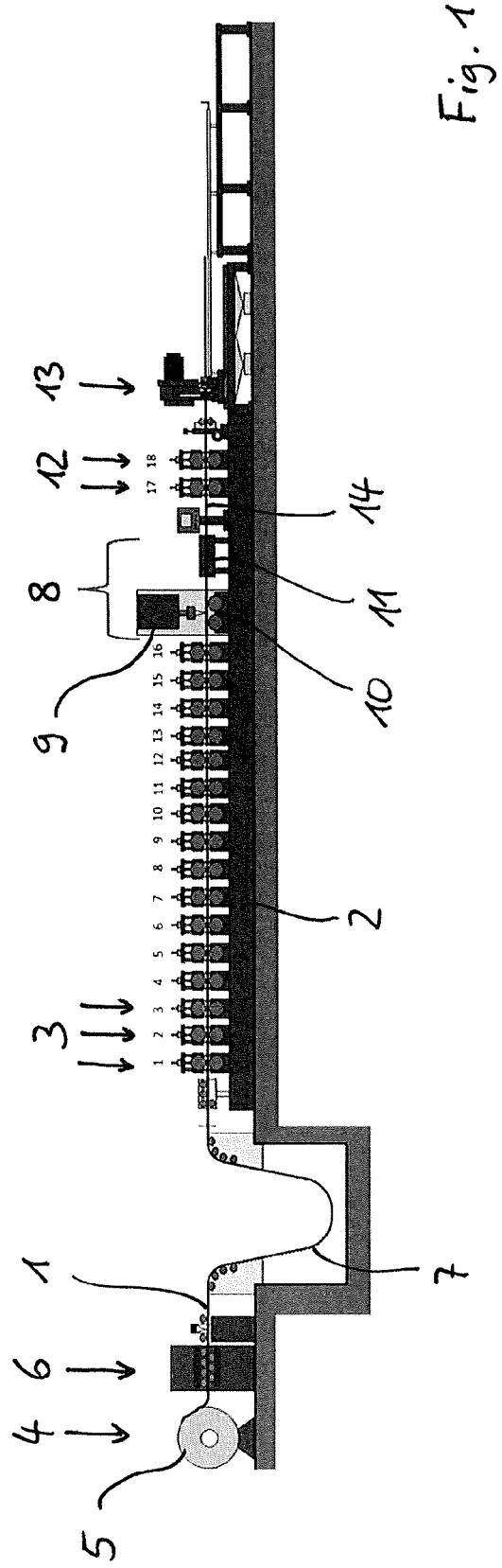
FIG. 1 shows a schematic illustration of a profiling installation which is or can be designed according to the invention.

FIG. 1 shows a profiling installation in a schematic lateral view. In the latter, a virtually endless material strip 1 made from metal is formed successively by means of a plurality of roll forming tools 2, which are grouped here in 16 forming stations 3, to form a profile. For this purpose, the material strip 1 is uncoiled from a coil 5 on a reel 4, guided through a straightening machine 6 and a loop 7 before it is formed continuously and successively longitudinally into the desired profile shape in the forming stations 3. Following the 16 forming stations 3, the material strip 1 or the profile then already formed into a closed profile shape passes through a joining zone 8. In said joining zone 8 there is a welding device 9 which closes the profile by welding at a joining point 10. In the joining zone 8, around and downstream of the joining point 10, there is at least part of a joining roller arrangement 11, only illustrated schematically here, in order to ensure that the weld seam is joined under controlled conditions and can cure in a controlled manner on the closed profile 14. The material strip 1 or the already closed profile 14 then passes through two further forming stations, which act as calibration stations 12, before it is then cut into individual hollow profiles with a desired length in a cutting-to-length station by a rotating cutting machine 13.

Figure 2:
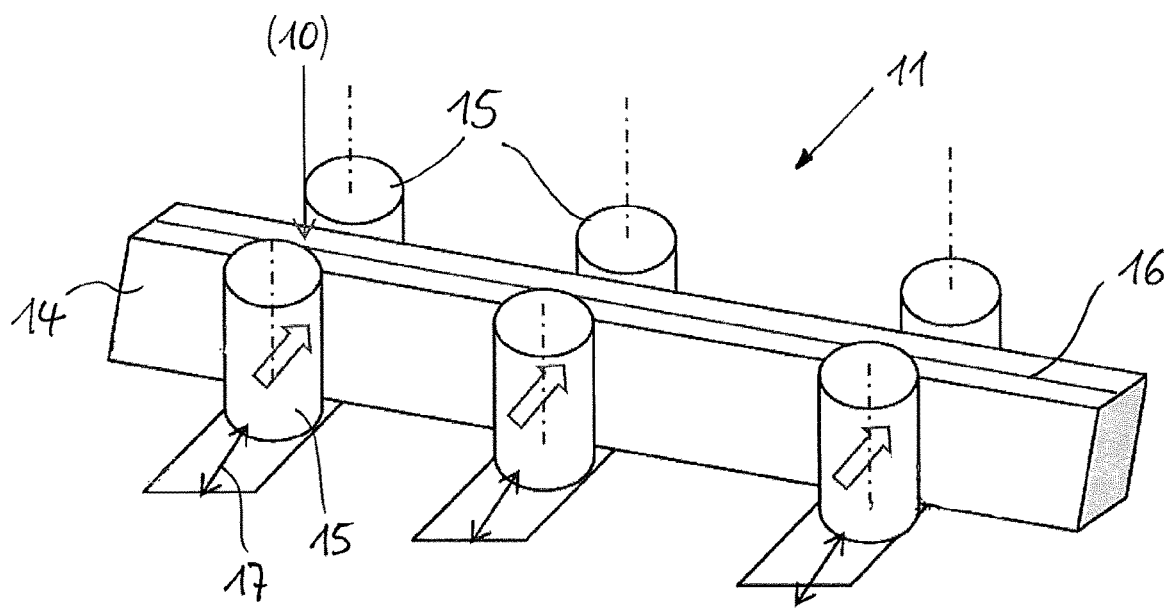
FIG. 2 shows a schematic illustration of a joining roller arrangement designed according to the invention, during the process.

FIG. 2 shows, in a schematic illustration, the joining roller arrangement 11 from FIG. 1, which is arranged in and downstream of the welding device 9. It should be noted at this juncture that it also lies within the scope of the present invention if the joining roller arrangement 11 is positioned directly on the joining point 10, depending on the joining method, or can be arranged not only downstream of the joining point 10, but also extending over the joining point 10.

The material strip 1 which has already been formed into a profile 14 with a closed profile shape is guided between three pairs of joining rollers 15 in the joining roller arrangement 11 illustrated in FIG. 2. A joining seam 16 which has been produced by the welding device 9 can be seen on the top side of the profile 14. Said joining seam 16 first of all has to cool and solidify before it is stable. During the time which this procedure requires, the profile is guided between the joining rollers 15 in such a manner that the joining seam 16 can neither open nor be loaded too greatly with pressure. For this purpose, the joining rollers 15, as indicated by double arrows 17, are adjustable towards the profile 14 and away from the latter. According to the invention, the joining rollers 15 are monitored, preferably at an adjustment mechanism (not illustrated) by means of force sensors, in order to detect the forces which act on the profile from the joining rollers 15—at least those force components which substantially contribute to loading the joining seam 16 or relieving the latter of load.

The reference sign 10 between parentheses indicates a possible joining point 10 here since this can also be localized between the first pair of joining rollers 15, i.e. the laser beam of the welding device 9 acts on the profile 14 at said joining point 10 and to this extent the joining roller arrangement 11, differently than illustrated in FIG. 1, extends over the entire joining zone 8, i.e. is also present at the joining point 10.

Figure 3:
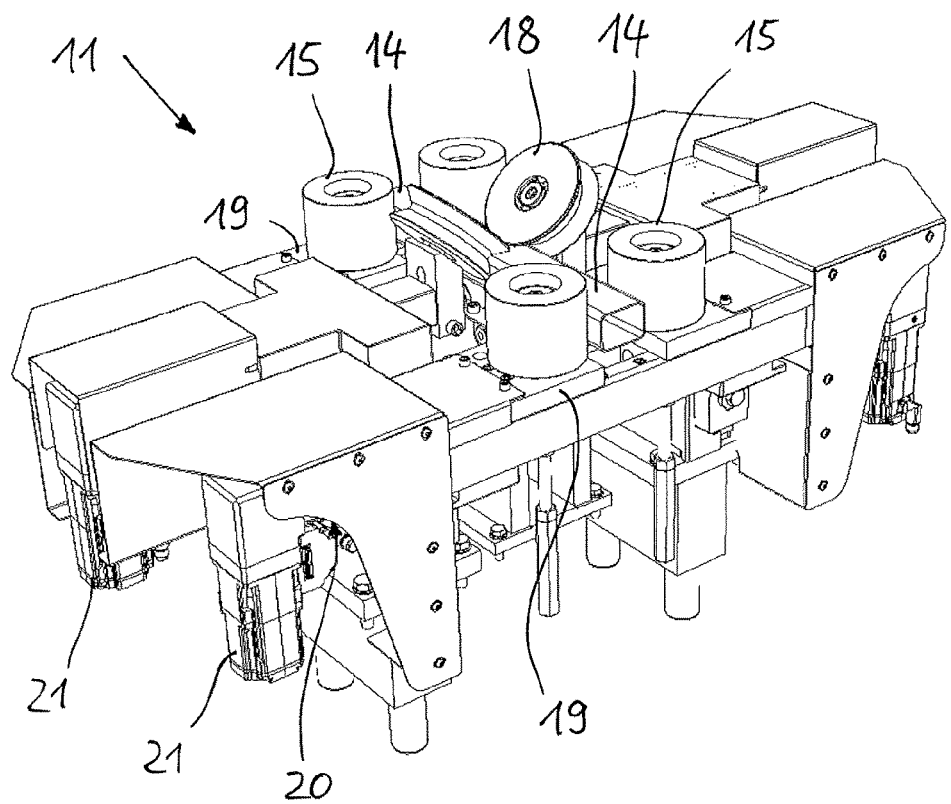
FIG. 3 shows a schematic illustration of a joining roller arrangement designed according to the invention with corresponding holding structures in the profiling installation.

FIG. 3 shows an alternative embodiment of the joining roller arrangement 11 in a less schematic illustration with some details. The profile 14 is stabilized here in turn between two pairs of vertically oriented cylindrical joining rollers 15, wherein two further joining rollers 18 act on the two upper edges of the profile 14, which is provided with an approximately rectangular cross section, in order to be able to cure the joining seam 16 even better under controlled conditions.

The details in FIG. 3 are intended to clarify the adjustment mechanism for the adjustable joining rollers 15, 18: the position of each individual joining roller 15, 18 can be changed via holding plates 19, spindles 20 and adjustment wheels to be operated by motor or manually. The further joining rollers 18 can be adjusted both vertically and horizontally here, as FIG. 3 indicates.

The force sensors or measurement transducers necessary for the detection according to the invention of forces or magnitudes of force components in the joining zone can be attached at very different points of the adjustment mechanism, for example to the holding plates 19, the adjustment wheels 21, the axles of the joining rollers 15, the spindles 20, in transverse guides and the like. The evaluation of the current signals of adjustment motors which are optionally present can also serve for evaluating the forces or force components.

FIG. 4 once again shows the basic construction of the joining roller arrangement 11 from FIG. 3 in a highly schematic illustration. The profile 14 with the joining seam 16 is held in a defined state between the adjustable joining rollers 15 and the likewise adjustable further joining rollers 18, which act on the upper edges of the profile 14, and the positions of the joining rollers 15, 18 are selected—according to the invention by monitoring forces and force components—and are optionally readjusted or regulated in such a manner that the joining seam 16, which here is a weld seam, can cure under controlled and reproducible conditions.

Figure 4:
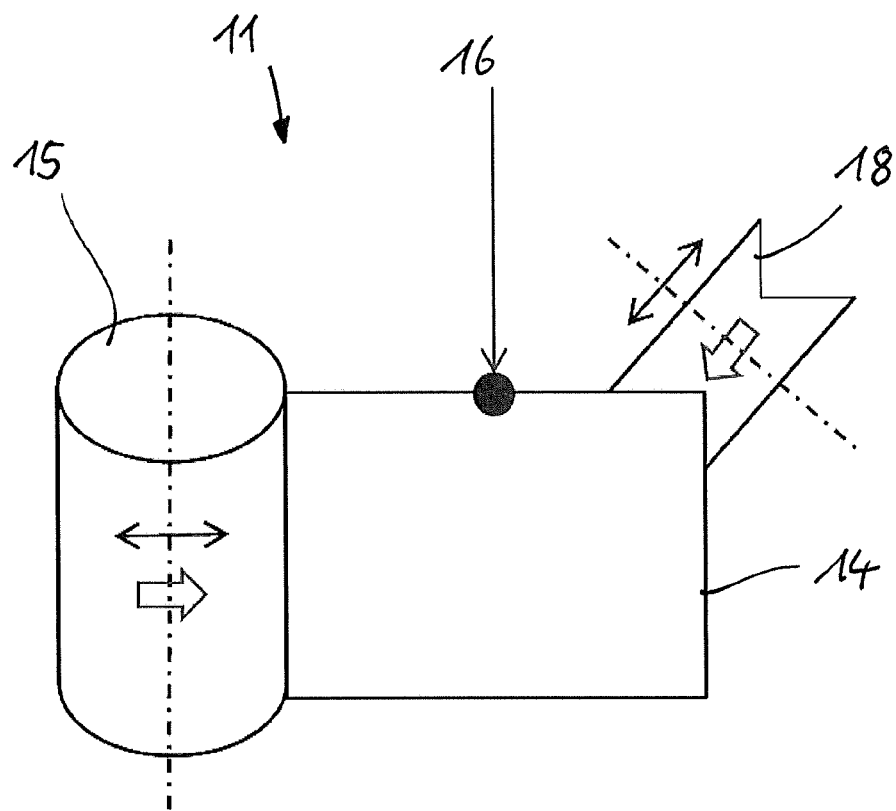
FIG. 4 shows a schematic illustration of a process example for integrally bonding joining in a joining roller arrangement according to the invention.
Figure 5:
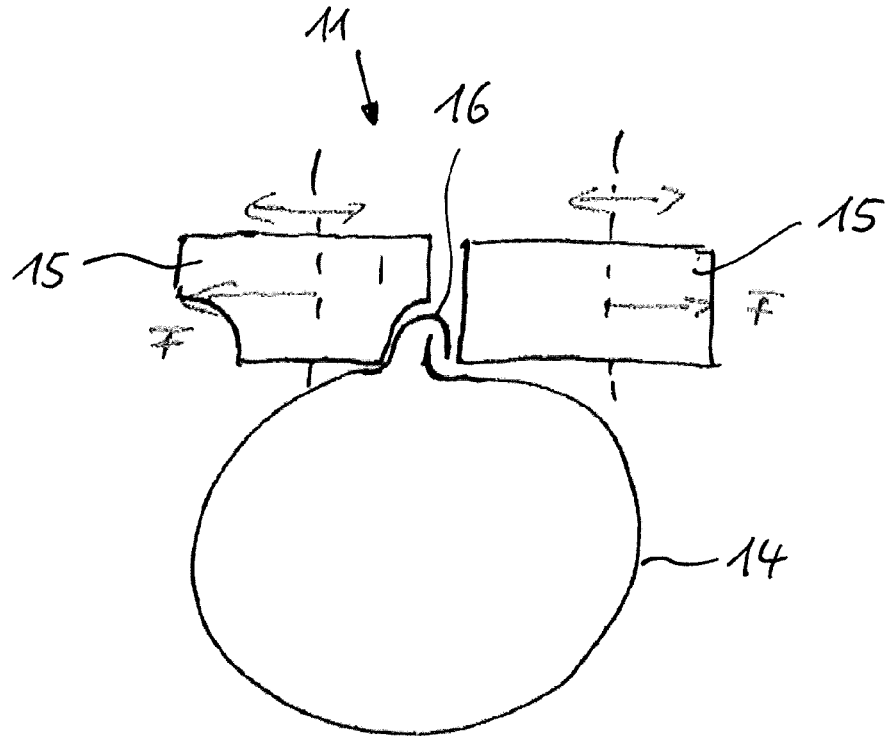
FIG. 5 shows a schematic illustration of a process example for interlocking joining in a joining roller arrangement designed according to the invention.

FIG. 5 shows a schematic illustration as per FIG. 4, but of a different exemplary embodiment: the profile 14 here is a tube with a substantially circular cross section, and the joining seam 16 is not produced here by welding, but rather by folding and optionally subsequent brazing. The folding is undertaken by means of two specially designed joining rollers 15, i.e. here the joining point 10 is illustrated in cross section. The two joining rollers 15 can be adjusted towards one another and away from another in order to form the joining seam 16 by forming the profile 14 to a greater or lesser extent at this point.

According to the invention, the forces which are exerted on the profile 14 at the joining seam 16 by the joining rollers 15 are in turn detected, and therefore the joining rollers 15 can always be positioned in such a manner that the joining seam 16 is not loaded with forming forces too weakly, but also not too greatly. The corresponding forces or force components can be detected, for example, quite simply by measurement transducers on the shafts or axles (not illustrated) of the joining rollers 15.

Figure 6:
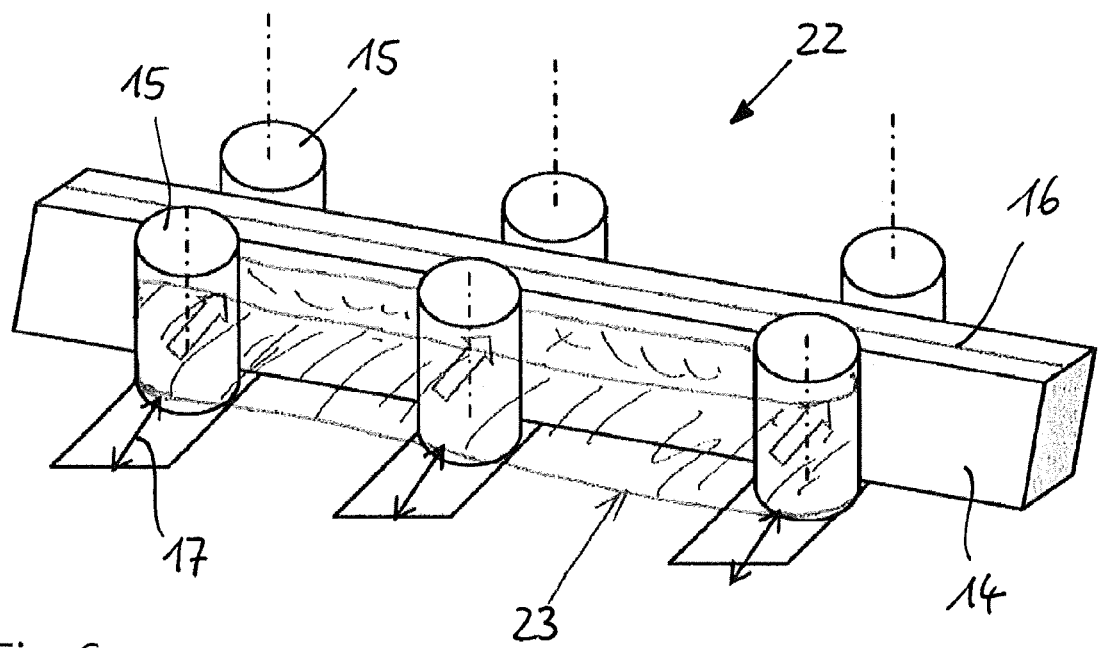
FIG. 6 shows a schematic illustration as per FIG. 2, but with a combined joining roller arrangement and planar joining arrangement.

FIG. 6 shows a further exemplary embodiment of curing, controlled according to the invention, of the joining seam 16 in the profile 14, specifically on the basis of an illustration which substantially corresponds to FIG. 2. Accordingly, the same elements are provided with identical reference signs.

The profile 14 with the joining seam 16 freshly produced by welding passes through three pairs of joining rollers 16 which are each adjustable in their relative positions with respect to the profile 14, and the profile 14 is held or transported between said pairs of joining rollers 15 with forces which are monitored according to the invention and which act on the profile 14 and in particular on the joining seam 16. A respective chain-like structure 23 similar to a conveyor belt is looped here around the joining rollers 15 on each side of the profile 14 such that a planar joining arrangement 22 is produced from the joining roller arrangement 11 as a result. This is because the chain-like structure 23 distributes the forces which act on the profile 14 from the joining rollers 15 and, in the exemplary embodiment according to FIG. 2, are transmitted via a linear contact, to a surface, and this more gently deals with a profile 14 having sensitive material, for example aluminum, or with a sensitive surface. The forces ultimately acting on the joining seam 16 can also be distributed more uniformly in the planar joining arrangement 22 by means of the chain-like structure 23. In addition, the surface of the chain-like structure 23 moves with the profile 14, which protects the surface of the profile 14.

Instead of the chain-like structure 23, a flexible belt, a link belt or a link chain can also be looped around the joining rollers 15 of the planar joining arrangement 22 illustrated in FIG. 6.

Figure 7:
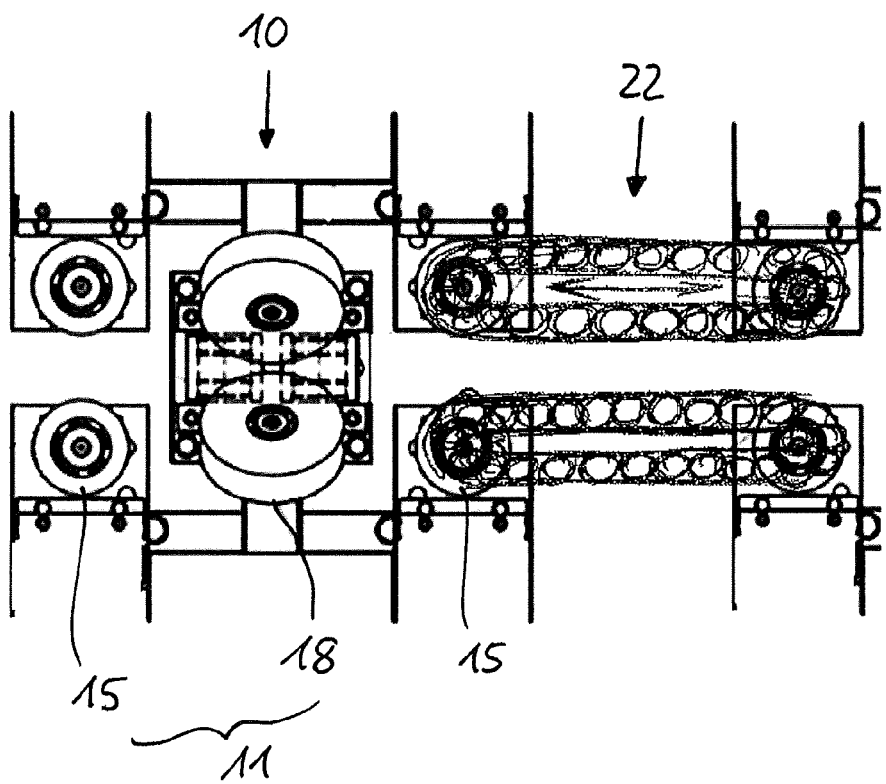
FIG. 7 shows a top view of the joining roller arrangement according to FIG. 3, but modified by provision of a planar joining arrangement in the form of a chain-like structure.

FIG. 7 finally shows, in a schematic top view, a joining roller arrangement 11 according to FIG. 3, but wherein, in addition, downstream of the further joining rollers 18, a planar joining arrangement 22 has been combined therewith. Said planar joining arrangement 22 is in turn formed from joining rollers 15, around which a chain-like structure 23 is looped in the manner of the chain of a crawler vehicle, here in order to protect sensitive surfaces of the profile 14 (not illustrated here) and to distribute the holding pressure in as planar a manner as possible to the profile 14 when the joining seam 16 cures.

The two joining rollers 15 illustrated on the left in FIG. 7 are responsible for feeding the profile 14 to the joining point 10 which is located between the further joining rollers 18. The joining seam 16 is then cured in stabilization zone 24 in which the profile 14 is held and guided by the planar joining arrangement 22 and can cure under controlled conditions—according to the invention by monitoring the forces exerted by the planar joining arrangement 22.

LIST OF REFERENCE SIGNS

1 Material strip
2 Roll forming tools
3 Forming stations
4 Reel
5 Coil
6 Straightening machine
7 Loop
8 Joining zone
9 Welding device
10 Joining point
11 Joining roller arrangement
12 Calibration stations
13 Cutting machine
14 Profile
15 Joining rollers
16 Joining seam
17 Double arrows
18 (Further) joining rollers
19 Holding plates
20 Spindles
21 Adjustment wheels
22 Planar joining arrangement
23 Chain-like structure
24 Stabilization zone

The invention claimed is:

1. A method for joining edges and/or surfaces of a profile (14) in a profiling installation for longitudinally forming a continuous material strip (1) or starter profile or plate into an at least partially closed profile shape, the method comprising:
   forming the material strip (1) or starter profile or the plate in the profiling installation using a plurality of roll forming tools (2) into the profile (14) which is at least partially closed;
   securing said profile (14) in a joining zone (8) of the profiling installation via a joining method, including at least one of welding, brazing, adhesive bonding or folding, during a longitudinal pass of the profile (14), forming a longitudinally running joining seam (16);
   passing the profile (14) in the joining zone (8) through at least one of a joining roller arrangement (11) or a planar joining arrangement (22) in order to feed the profile (14) in a controlled manner to a joining point (10) and stabilizing said profile at least one of at or downstream of the joining point (10), and ensure that the profile (14) is dimensionally stable during and after joining;
   detecting forces or magnitudes of force components which act on the profile (14) from at least one of joining rollers (15, 18) of the joining roller arrangement or at least one subsection of the planar joining arrangement (22) in the joining zone (8);
   after the profile (14) passes the joining point (10), passing the profile (14) through a stabilization zone (24) within the joining zone in order to stabilize the connecting seam by at least one of cooling or curing, at least one of a) a part of the joining roller arrangement (11) or b) a part of the planar joining arrangement (22) that serves for stabilizing the profile (14) in the stabilization zone (24); and
   detecting forces which act on the profile (14) from at least one of a) at least one said joining roller (15) or b) at least part of the planar joining arrangement (22) in the stabilization zone (24).

2. The method according to claim 1, wherein the planar joining arrangement (22) includes a plurality of the joining rollers (15), around which a flexible belt, a link belt, a link chain or a chain-like structure (23) is looped in order to make contact with the profile (14) by a planar contact region which moves together with the profile (14) and distributes a holding pressure in a planar manner to the profile (14).

3. The method according to claim 1, further comprising determining contact pressures acting on the profile (14) in at least one spatial direction from at least one of a) at least some of the joining rollers (15) or b) the planar joining arrangement (22) by detecting the forces acting on the profile at at least one of the joining point (10) or within the joining zone (8).

4. The method according to claim 3, further comprising at least partially regulating the contact pressures acting on the profile (14) in the joining zone (8) based on the detected forces or force components by adjusting at least of a) one said joining roller (15) in the joining roller arrangement (11) or b) at least part of the planar joining arrangement (22), such that the contact pressures acting on the profile at least at one of the joining point (10) or behind the joining point (10) from at least one of the joining rollers (15) or the planar joining arrangement (22) are regulated.

5. The method according to claim 4, further comprising, for the regulation of the contact pressures, taking into account further process parameters, including at least one of actual positions of the regions of the profile (14) that are to be joined, roller positions, or a position of the planar joining arrangement (22).

6. The method according to claim 1, further comprising using specifications for at least one of the contact pressures or forces acting on the profile (14) in the joining zone (8) as target values for setting up at least one of the joining roller arrangement (21) or the planar joining arrangement (24).

7. The method of claim 1, further comprising continuously detecting forces in at least one of the joining roller arrangement (11) or the planar joining arrangement (24), said forces acting on the profile (14) from at least one a) at least one said joining roller (15) or b) at least a part of the planar joining arrangement (22), in order to identify changes in the process conditions, and outputting a warning indication when changes are identified.

8. A method according to claim 1, further comprising, after the joining zone (8), at least one of detecting or checking a quality of at least one of the joining seam or of the component.

9. A method according to claim 1, further comprising continuously optimizing target values for forces acting on the profile (14) in the joining zone (8) using machine learning algorithms.

\* \* \* \* \*